E. F. KELLEY.
BRAKE.
APPLICATION FILED SEPT. 6, 1910.
977,744.
Patented Dec. 6, 1910.
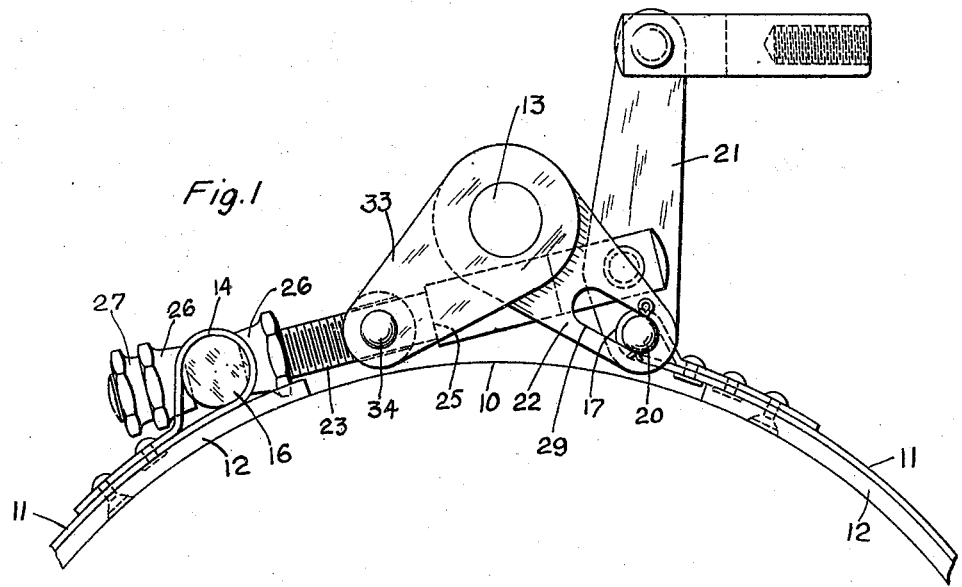
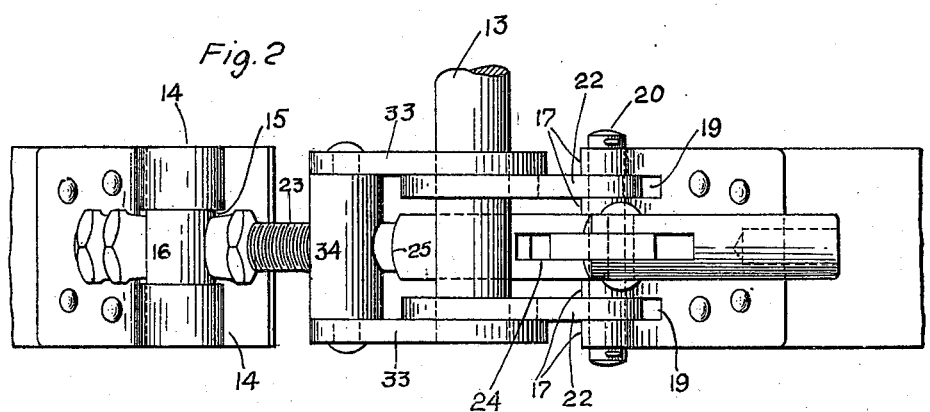
WITNESSES:
H. W. Meade
S. W. Atherton.
INVENTOR
Edward F. Kelley
BY
A. M. Wooster
ATTORNEY

UNITED STATES PATENT OFFICE.

EDWARD F. KELLEY, OF BRIDGEPORT, CONNECTICUT, ASSIGNOR TO THE ROYAL EQUIPMENT COMPANY, OF BRIDGEPORT, CONNECTICUT, A CORPORATION OF CONNECTICUT.

BRAKE.

977,744.   Specification of Letters Patent.   Patented Dec. 6, 1910.

Application filed September 6, 1910. Serial No. 580,612.

*To all whom it may concern:*

Be it known that I, EDWARD F. KELLEY, a citizen of the United States, residing at Bridgeport, county of Fairfield, State of Connecticut, have invented an Improvement in Brakes, of which the following is a specification.

This invention relates to the class of brakes described and claimed in patent to Vanderbeek, Number 958,446, dated May 17, 1910, in which a relatively large braking effect compared with the operating force is secured through the "wrapping" or "winding" effect of a flexible band in contact with a rotating drum, one end of said band being fixed while the operating force is applied to the other end in the direction of rotation of the drum, means being provided by which either end of the band automatically becomes the fixed end depending upon the direction of rotation of the drum, and the invention consists in certain parts, improvements and combinations by which the range of use of the brake is greatly extended. This I accomplish by so constructing and combining the parts that the adjusting bolt passes under the fixed arm or support instead of through it. This enables me by means of sets of link plates of varying length to adapt the brake to conditions in which the height of the fixed arm above the drum may vary from a fraction of an inch to four inches.

With these and other objects in view I have devised the novel brake of which the following description in connection with the accompanying drawing is a specification, reference characters being used to indicate the several parts.

Figure 1 is a side elevation of the brake complete as in use; and Fig. 2 is a plan view, the drum being omitted.

10 denotes the brake drum, 11 the brake band, 12 the brake pad or lining and 13 a fixed arm or support by which the brake is carried. The brake pad lies in proximity to the drum and is secured to and retained in place by the band. The left end of the brake band, as shown in the drawing, is connected to a stud 16 having a transverse hole for a purpose presently to be explained. In the present instance the band is shown as curved over backward and riveted to itself to form eyes 14, there being an opening 15 between the eyes corresponding with the hole in the stud. The right end of the brake band, as shown in the drawing, is connected to a stud 20. In the present instance the band is shown as curved over backward on itself and riveted to itself to form eyes 17, four in number. Between the two central eyes is an opening in which the operating lever 21 is pivoted on stud 20, and between the central eyes and the end eyes are openings 19.

22 denotes link plates which are pivoted on arm 13 and the opposite ends of which are loosely connected to stud 20, as by means of slots 29 in the link plates through which the stud passes, and lie in openings 19. 33 denotes other link plates which are pivoted on arm 13, extend at an angle to link plates 22 and the opposite ends of which are pivoted on the reduced ends of a stud 34. For convenience in description, link plates 22 may be described as the right link plates and link plates 33 as the left link plates.

23 denotes an adjusting bolt which slides freely in a transverse hole in stud 34 and passes through the transverse hole in stud 16, is provided with a yoke 24 by means of which it is pivoted to the operating lever, with a shoulder 25 adapted to engage stud 34, for a purpose presently to be explained, and the other end of which is provided with adjusting nuts 26 lying in opening 15 and adapted to engage stud 16. The function of this adjusting bolt and the adjusting nuts is to provide a means for taking up the wear of the brake pad so as to insure close contact of the brake pad with the drum in braking.

27 denotes a set nut which may be used to lock the outer nut 26 in place after adjustment.

It is of course well understood that in brakes of this character the action of the operating lever is to set the brakes, and that the first effect of the operation of the lever is to cause the drum to pick up the brake pad and carry it slightly in the direction of its movement, the braking action being produced by the close wrapping of the brake pad about the drum. In order to secure equally perfect action of the brake when the drum is turning either forward or backward, it is necessary to provide for longitudinal movement of both the right link plates and the adjusting screw, so that the fixed point of support of the brake band will automatically shift from one end of the band to the other. When the drum is turning forward and the brake is applied, the right link plates become holding members, stud 20 moves to the right end of slots 29 and the brake is set by pull upon the left end of the band. When the drum is turning backward and the brake is applied, the adjusting screw becomes the holding member through the engagement of shoulder 25 with stud 34, stud 20 moving toward the left in slots 29, and the brake being set by pull upon the right end of the band. By placing the adjusting bolt below the arm or support and leaving said parts wholly independent of each other I am enabled, by providing three, more or less, sets of link plates, to furnish brakes that may be applied to any motor car having a rotating drum without regard to the height of the arm above the drum, it being obvious that it is not necessary for the right and left pairs of link plates to have any special angle of inclination relatively to each other. Three sets of link plates of varying length will in practice provide for any possible variation in the height of arms from a fraction of an inch to four inches which may be considered a limit.

The operation is as follows: When the upper end of the operating lever, as seen in Fig. 1, is moved toward the right, the first effect is to draw the ends of the brake band and brake pad toward each other and close the brake pad about the drum. An instant later the brake pad is picked up by the drum and carried slightly in the direction of its rotation. If the drum is turning forward, that is toward the right as seen in the drawing, the pad will be carried by the drum until stud 20 engages the right ends of slots 29 in the right link plates, which stops further movement of the brake band and brake pad and causes the pad to wrap tightly about the drum and thus secure the most perfect frictional braking action possible, the pull being upon arm 13 through the right link plates. Suppose now that the drum is rotating backward, that is toward the left as seen in the drawing, and that the brake is set by means of the operating lever. The first effect is to draw the ends of the brake band and brake pad toward each other and close the brake pad about the drum, as before. An instant later the brake pad is picked up by the drum as before and carried backward until shoulder 25 on the adjusting bolt engages stud 34, which stops further movement of the brake band and brake pad and causes the pad to wrap tightly about the drum and thus secure perfect frictional braking action, the pull being upon arm 13 through the left link plates.

Having thus described my invention I claim:

1. A brake comprising a band adapted to engage a rotary drum, pairs of pivoted link plates, one pair of link plates being loosely connected with one end of the brake band, an operating lever pivotally connected with the brake band at the point of connection with the link plates, a stud to which the other pair of link plates are pivotally connected and an adjusting bolt pivotally connected to the operating lever and passing through the stud, the other end of said bolt being connected to the other end of the brake band.

2. As an improvement in brakes, a brake band adapted to engage a rotary drum, an operating lever connected to one end of said band, pairs of pivoted link plates, one pair of link plates being loosely connected to the same end of the band, a stud to which the other pair of link plates are pivoted, and an adjusting bolt which passes through said stud and connects the other end of the brake band with the operating lever, said bolt being movable with relation to said stud and being provided with means for engaging said stud to limit the movement of the bolt.

3. A brake comprising a rotary drum, a brake band inclosing the drum, an operating lever connected to one end of the band, pairs of pivoted link plates, one pair of link plates being pivotally connected to the same end of the band, a stud to which the other pair of link plates are pivoted and which is provided with a transverse hole and a longitudinally movable adjusting bolt which passes through said hole, is connected to the operating lever and to the other end of the band, and is provided with a shoulder adapted to engage the stud to limit the movement of the band when the drum is turned backward.

4. A brake comprising a band having eyes at one end with an opening between them, a stud in said eyes having a transverse hole, a second stud also having a transverse hole, an operating lever connected to one end of the band, an adjusting bolt connected to said lever, passing through said studs and having a shoulder adapted to engage the second mentioned stud, for the purpose set forth, nuts on said bolt lying in the opening between the eyes and engaging the first mentioned stud and pairs of pivoted link plates, one pair of link plates having slotted connection with the end of the band to which the operating lever is pivoted and the other pair of link plates being pivoted to the second mentioned stud.

5. As an improvement in brakes, an arm, a brake band adapted to engage a rotary drum, a stud carried by one end of said band, an operating lever pivotally mounted on said stud, pairs of link plates pivoted on said arm, one pair of said plates being loosely connected with said stud, a second stud to which the other pair of link plates are pivoted and a longitudinally movable adjusting bolt connecting the other end of the band with the operating lever and passing through the second mentioned stud, said bolt having a shoulder adapted to engage said stud, for the purpose set forth.

6. A brake comprising a band adapted to engage a rotary drum, an arm, pairs of link plates pivoted on said arm, one pair of link plates having slotted connection with one end of the band, an operating lever pivoted to the same end of the band, a stud to which the other pair of link plates are pivoted and which is provided with a transverse hole and an adjusting bolt pivoted to the operating lever passing under the arm and through the hole in the stud and having a shoulder adapted to engage the stud, for the purpose set forth, the other end of said bolt being connected to the other end of the band.

In testimony whereof I affix my signature in presence of two witnesses.

EDWARD F. KELLEY.

Witnesses:
 FRED. W. KNOWLES,
 C. M. NEVINS.